United States Patent
Boragno et al.

(10) Patent No.: US 9,695,261 B2
(45) Date of Patent: Jul. 4, 2017

(54) PROPYLENE COPOLYMER WITH HIGH IMPACT PROPERTIES

(71) Applicant: Borealis AG, Vienna (AU)

(72) Inventors: Luca Boragno, Linz (AU); Luigi Resconi, Ferrara (IT); Johanna Lilja, Porvoo (FI); Markus Gahleitner, Krems (AU)

(73) Assignee: Borealis AG (AT)

( * ) Notice: Subject to any disclaimer, the term of this patent is extended or adjusted under 35 U.S.C. 154(b) by 0 days.

(21) Appl. No.: 14/776,400

(22) PCT Filed: Mar. 24, 2014

(86) PCT No.: PCT/EP2014/055795
§ 371 (c)(1),
(2) Date: Sep. 14, 2015

(87) PCT Pub. No.: WO2014/154610
PCT Pub. Date: Oct. 2, 2014

(65) Prior Publication Data
US 2016/0060371 A1     Mar. 3, 2016

(30) Foreign Application Priority Data

Mar. 26, 2013    (EP) .................... 13161132

(51) Int. Cl.
*C08L 23/14*     (2006.01)
*C08F 210/06*    (2006.01)
*C08F 4/6592*    (2006.01)
*C08F 4/659*     (2006.01)

(52) U.S. Cl.
CPC .......... *C08F 210/06* (2013.01); *C08F 4/6592* (2013.01); *C08L 23/14* (2013.01); *C08L 23/142* (2013.01); *C08F 4/65912* (2013.01)

(58) Field of Classification Search
CPC ...... C08F 210/06; C08F 4/6592; C08F 2/001; C08L 23/14; C08L 23/142
See application file for complete search history.

(56) References Cited

FOREIGN PATENT DOCUMENTS

| EP | 0586390 B1 | 5/1997 |
|---|---|---|
| EP | 0591224 B1 | 2/1998 |
| EP | 0887379 A1 | 12/1998 |
| EP | 0491566 B2 | 3/2005 |
| KR | 2005-0005557 A | 1/2005 |
| WO | 9212182 A1 | 7/1992 |
| WO | 9736938 A1 | 10/1997 |
| WO | 9924478 A1 | 5/1999 |
| WO | 9924479 A1 | 5/1999 |
| WO | 0068315 A1 | 11/2000 |
| WO | 0148034 A2 | 7/2001 |
| WO | 03051934 A2 | 6/2003 |
| WO | 03/106523 A1 | 12/2003 |
| WO | 2004000899 A1 | 12/2003 |
| WO | 2004111095 A1 | 12/2004 |
| WO | 2006069733 A1 | 7/2006 |
| WO | 2009019169 A1 | 2/2009 |
| WO | 2011/084468 A1 | 7/2011 |

OTHER PUBLICATIONS

Office Action for Chinese Patent Application No. 201480014324.9 dated Aug. 2, 2016.
Notice of Grounds for Rejection for Korean Patent Application No. 2015-7028503 dated Sep. 5, 2016.
European Search Report dated May 21, 2013.
Wen-Jun Wang, et al. "Structural Analysis of Ethylene/Propylene Copolymers Synthesized with a Constrained Geometry Catalyst", Macromolecules 2000, 33, 1157-1162.
Vincenzo Busico, et al. "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
H. N. Cheng "13C NMR Analysis of Ethylene-Propylene Rubbers", Macromolecules 1984, 17, 1950-1955.
Resconi, et al. "Selectivity in Propene Polymerization with Metallocene Catalysts", Chem, Rev. 2000, 100, 1253-1345.
Zhe Zhou, et al. "A new decoupling method for accurate quantification of polyethylene copolymer composition and triad sequence distribution with 13C NMR", Journal of Magnetic Resonance 187 (2007) 225-233.
Resconi et al., Chemical Reviews, 2000, vol. 100, No. 4, pp. 1316-1328.
P. Galli, G. Vecellio "Technology: driving force behind innovation and growth of polyolefins", Prog. Polym. Sci. 26 (2001) 1287-1336.

*Primary Examiner* — Caixia Lu

(74) *Attorney, Agent, or Firm* — Tarolli, Sundheim, Covell & Tummino LLP

(57) ABSTRACT

Monophasic propylene copolymer with high stiffness and impact resistance.

16 Claims, No Drawings

PROPYLENE COPOLYMER WITH HIGH IMPACT PROPERTIES

The present invention is directed to a new propylene copolymer, a process for its manufacture as well as articles made therefrom.

Propylene copolymers are very well known and quite often used in the field of packaging. In this technical area packaging material is required which combines high transparency and high impact strength. Quite often also high flowability of the used polymer is desired. However it is demanding to fulfill all the required demands with one polymer since the improvement of one property is paid on the expense of another property.

EP 2 281 851 describes a bimodal propylene copolymer. One fraction of the copolymer is a propylene homopolymer. The impact strength values are rather low.

EP 0 860 457 discloses a heterophasic system. The impact performance even though containing elastomeric phase is not very high.

EP 0 339 804 is directed to a modified polypropylene. Again, the impact performance is not very good.

Accordingly there is the need to provide a polypropylene with high impact performance without compromising the other properties, especially the optical properties.

The finding of the present invention is to provide a propylene copolymer with regular insertion of the comonomer into the polymer chain by keeping the overall comonomer content in a specific range. Preferably the molecular weight distribution is rather broad.

Accordingly, the present invention is directed to a propylene copolymer (R-PP) having
(a) a melt flow rate $MFR_2$ (230° C.) measured according to ISO 1133 in the range of more than 2.5 to 15.0 g/10 min,
(b) a comonomer content in the range of 2.0 to below 12.0 mol.-%,
(c) a melting temperature in the range of 125 to below 143° C., and
(d) a xylene cold soluble fraction (XCS) in the range of 17.0 to 45.0 wt.-%.

Preferably the propylene copolymer (R-PP) is monophasic and/or has a broad molecular weight distribution. A broad molecular weight distribution according to this invention means that the propylene copolymer (R-PP) has
(a) a molecular weight distribution (Mw/Mn) of at least 2.7; and/or
(b) a polydispersity index (PI) of at least 2.3.

Further preferred the propylene copolymer (R-PP) has no glass transition temperature below −20° C.

Surprisingly the propylene copolymer (R-PP) according to the invention has an exceptionally high impact and good optical properties.

In the following the propylene copolymer (R-PP) is defined in more detail.

As mentioned above the propylene copolymer (R-PP) according to this invention is preferably monophasic. Accordingly it is preferred that the propylene copolymer (R-PP) does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (R-PP) according to this invention has no glass transition temperature below −30, preferably below −25° C., more preferably below −20° C.

On the other hand, in one preferred embodiment the propylene copolymer (R-PP) according to this invention has a glass transition temperature in the range of −12 to +2° C., more preferably in the range of −10 to +2° C.

Further it is preferred that the propylene copolymer (R-PP) has a Charpy notched impact strength at 23° C. of at least 7.0 $kJ/m^2$, more preferably in the range of 7.0 to 15 $kJ/m^2$, still more preferably in the range of 8.0 to 12 $kJ/m^2$. Furthermore, the Charpy notched impact strength at 0° C. of the propylene copolymer (R-PP) is preferably at least 1.8 $kJ/m^2$, more preferably in the range of 1.8 to 5.0 $kJ/m^2$, still more preferably in the range of 1.9 to 4.0 $kJ/m^2$.

The propylene copolymer (R-PP) according to this invention has a melt flow rate $MFR_2$ (230° C.) measured according to ISO 1133 in the range of more than 2.5 to 15.0 g/10 min, more preferably in the range of 3.0 to 12.0 g/10 min, still more preferably in the range of 5.0 to 10.0 g/10 min.

Further the propylene copolymer (R-PP) has a melting temperature of at least 125° C., more preferably in the range of 125 to below 143° C., still more preferably in the range of 128 to 142° C., like in the range of 129 to 140° C.

The xylene soluble content can be in a rather broad range. Accordingly it is preferred that the propylene copolymer (R-PP) has a xylene cold soluble fraction (XCS) in the range of 17.0 to 45.0 wt.-%, preferably in the range of 17.0 to 40.0 wt.-%, more preferably in the range of equal or more than 18.0 to 39.0 wt-%.

Further it is preferred that the propylene copolymer (R-PP) has a hexane soluble content of below 8.0 wt.-%, more preferably in the range of above 2.0 to below 8.0 wt.-%, still more preferably in the range of 2.5 to 6.0 wt.-%.

The propylene copolymer (R-PP) comprises apart from propylene also comonomers. Preferably the propylene copolymer (R-PP) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene and
(b) ethylene and/or $C_4$ to $C_{12}$ α-olefins.

Thus the propylene copolymer (R-PP) according to this invention comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene. In a preferred embodiment the propylene copolymer (R-PP) according to this invention comprises units derivable from ethylene and propylene only.

Additionally it is appreciated that the propylene copolymer (R-PP) preferably has a comonomer content in a very specific range which contributes to the impact strength and the good optical properties. Thus it is required that the comonomer content of the propylene copolymer (R-PP) is in the range of 2.0 to below 12.0, preferably in the range of 2.2 to below 10.8 mol.-%, more preferably in the range of 2.5 to below 10.0 mol.-%, still more preferably in the range of 3.5 to 9.5 mol.-%, yet more preferably in the range of 4.0 to below 9.2 mol.-%, still yet more preferably in the range of equal or more than 4.5 to 9.0 mol.-%.

Preferably the propylene copolymer (R-PP) is featured by a rather broad molecular weight distribution. The molecular weight distribution can be determined by Gel Permeation Chromatography or by shear viscosity. Accordingly it is preferred that the propylene copolymer (R-PP) has (a) a molecular weight distribution (Mw/Mn) of at least 2.7, more preferably in the range of 2.7 to 4.5, still more preferably in the range of 2.9 to 4.0, like in the range of 2.9 to 3.7;

and/or (b) a polydispersity index (PI) of at least 2.3, more preferably in the range of 2.3 to 3.5, still more preferably in the range of 2.4 to 3.2, like in the range of 2.5 to 3.0.

Preferably the propylene copolymer according to this invention has been produced in the presence of a metallocene catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes. These regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000, 100(4), pages 1316-1327. By introducing defects into the polymer chain, such as comonomers, stereo-errors or regio-defects, the physical properties of polypropylene can be modified. In particular, by increasing the amount of chain defects, crystallinity and melting point of polypropylene can be reduced.

The term "2,1 regio defects" as used in the present invention defines the sum of 2,1 erythro regio-defects and 2,1 threo regio-defects.

Accordingly it is preferred that the propylene copolymer (R-PP) according to this invention has 2,1 regio-defects, like 2,1 erythro regio-defects, of at least 0.1%, more preferably of at least 0.2%, still more preferably in the range of 0.2 to 4.0%, determined by $^{13}$C-NMR spectroscopy. For example, the propylene copolymer (R-PP) of the instant invention has 2,1 regio-defects, like 2,1 erythro regio-defects, of from 0.4 to 0.7%, determined by $^{13}$C-NMR spectroscopy.

The propylene copolymer (R-PP) preferably comprises at least two polymer fractions, like two or three polymer fraction, all of them being propylene copolymers. Preferably the random propylene copolymer (R-PP) comprises at least two different propylene copolymer fractions, like two different propylene copolymer fractions, wherein further the two random propylene copolymer fractions differ in the comonomer content and/or in the melt flow rate MFR$_2$ (230° C.), preferably differ in the comonomer content and in the melt flow rate MFR$_2$ (230° C.).

Preferably one fraction of the two polymer copolymer fractions of the propylene copolymer (R-PP) is the comonomer lean fraction and the other fraction is the comonomer rich fraction, wherein more preferably the lean fraction and the rich fraction fulfill together inequation (I), more preferably inequation (Ia), still more preferably inequation (Ib), $$\frac{Co(\text{rich})}{Co(\text{lean})} \geq 2.0, \tag{I}$$

$$2.0 \leq \frac{Co(\text{rich})}{Co(\text{lean})} \leq 6.0, \tag{Ia}$$

$$2.5 \leq \frac{Co(\text{rich})}{Co(\text{lean})} \leq 5.5 \tag{Ib}$$

wherein

Co (lean) is the comonomer content [mol.-%] of the propylene copolymer fraction with the lower comonomer content, Co (rich) is the comonomer content [mol.-%] of the propylene copolymer fraction with the higher comonomer content.

In addition or alternatively to inequation (I) one fraction of the two polymer copolymer fractions of the propylene copolymer (R-PP) is the low melt flow rate MFR$_2$ (230° C.) fraction and the other fraction is the high melt flow rate MFR$_2$ (230° C.) fraction, wherein more preferably the low flow fraction and the high flow fraction fulfill together inequation (II), more preferably inequation (IIa), still more preferably inequation (IIb), $$\frac{MFR(\text{high})}{MFR(\text{low})} \geq 1.1 \tag{II}$$

$$1.2 \leq \frac{MFR(\text{high})}{MFR(\text{low})} \leq 5.0 \tag{IIa}$$

$$1.8 \leq \frac{MFR(\text{high})}{MFR(\text{low})} \leq 4.5 \tag{IIb}$$

wherein

MFR (high) is the melt flow rate MFR$_2$ (230° C.) [g/10 min] of the propylene copolymer fraction with the higher melt flow rate MFR$_2$ (230° C.), MFR (low) is the melt flow rate MFR$_2$ (230° C.) [g/10 min] of the propylene copolymer fraction with the lower melt flow rate MFR$_2$ (230° C.).

Even more preferred the propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and/or in the melt flow rate MFR$_2$ (230° C.), preferably differ in the comonomer content and in the melt flow rate MFR$_2$ (230° C.).

Thus in one embodiment the first random propylene copolymer fraction (R-PP1) has a higher comonomer content and melt flow rate MFR$_2$ (230° C.) than the second random propylene copolymer fraction (R-PP2).

In another embodiment the first random propylene copolymer fraction (R-PP1) has a higher comonomer content but a lower melt flow rate MFR$_2$ (230° C.) than the second random propylene copolymer fraction (R-PP2).

In still another embodiment the second random propylene copolymer fraction (R-PP2) has a higher comonomer content but a lower melt flow rate MFR$_2$ (230° C.) than the first random propylene copolymer fraction (R-PP1).

In further embodiment the second random propylene copolymer fraction (R-PP2) has a higher comonomer content and melt flow rate MFR$_2$ (230° C.) than the first random propylene copolymer fraction (R-PP1). This embodiment is especially preferred.

Accordingly it is preferred that the first random propylene copolymer fraction (R-PP1) and the second random propylene copolymer fraction (R-PP2) fulfill together the inequation (III), more preferably inequation (IIIa), still more preferably inequation (IIIb), $$\frac{Co(R-PP2)}{Co(R-PP1)} \geq 2.0, \tag{III}$$

$$2.0 \leq \frac{Co(R-PP2)}{Co(R-PP1)} \leq 6.0, \tag{IIIa}$$

$$2.5 \leq \frac{Co(R-PP2)}{Co(R-PP1)} \leq 5.5 \tag{IIIb}$$

wherein
Co (R-PP1) is the comonomer content [mol.-%] of the first propylene copolymer fraction (R-PP1),
Co (R-PP2) is the comonomer content [mol.-%] of the second propylene copolymer fraction (R-PP2).

In addition or alternatively to inequation (III) the first propylene copolymer fraction (R-PP1) and the second propylene copolymer fraction (R-PP2) fulfill together the inequation (IV), more preferably inequation (IVa), still more preferably inequation (IVb), $$\frac{MFR(R-PP2)}{MFR(R-PP1)} \geq 1.1 \tag{IV}$$

$$1.2 \leq \frac{MFR(R-PP2)}{MFR(R-PP1)} \leq 5.0 \tag{IVa}$$

$$1.8 \leq \frac{MFR(R-PP2)}{MFR(R-PP1)} \leq 4.5 \tag{IVb}$$

wherein
MFR (R-PP1) is the melt flow rate MFR$_2$ (230° C.) [g/10 min] of the first propylene copolymer fraction (R-PP1),
MFR (R-PP2) is the melt flow rate MFR$_2$ (230° C.) [g/10 min] of the second propylene copolymer fraction (R-PP2).

It is especially preferred that the propylene copolymer (R-PP) has a higher comonomer content and/or melt flow rate MFR$_2$ (230° C.) than the first random propylene copolymer fraction (R-PP1). It is in particular preferred that the propylene copolymer (R-PP) has a higher comonomer content and melt flow rate MFR$_2$ (230° C.) than the first random propylene copolymer fraction (R-PP1).

Accordingly the random propylene copolymer (R-PP) comprises, preferably consists of, the first random propylene copolymer fraction (R-PP1) and the second random propylene copolymer fraction (R-PP2), wherein further the random propylene copolymer (R-PP) fulfills
(a) the inequation (V), more preferably inequation (Va), still more preferably inequation (Vb), $$\frac{Co(R-PP)}{Co(R-PP1)} \geq 0.5, \tag{V}$$

$$0.5 \leq \frac{Co(R-PP)}{Co(R-PP1)} \leq 5.0, \tag{Va}$$

$$1.0 \leq \frac{Co(R-PP)}{Co(R-PP1)} \leq 3.0 \tag{Vb}$$

wherein
Co (R-PP1) is the comonomer content [mol.-%] of the first random propylene copolymer fraction (R-PP1),
Co (R-PP) is the comonomer content [mol.-%] of the propylene copolymer (R-PP). and/or
(b) the inequation (VI), more preferably inequation (VIa), still more preferably inequation (VIb), $$\frac{MFR(R-PP)}{MFR(R-PP1)} \geq 1.1 \tag{VI}$$

$$1.1 \leq \frac{MFR(R-PP)}{MFR(R-PP1)} \leq 3.0 \tag{VIa}$$

$$1.5 \leq \frac{MFR(R-PP)}{MFR(R-PP1)} \leq 2.90 \tag{VIb}$$

wherein
MFR (R-PP1) is the melt flow rate MFR$_2$ (230° C.) [g/10 min] of the first random propylene copolymer fraction (R-PP1),
MFR (R-PP) is the melt flow rate MFR$_2$ (230° C.) [g/10 min] of the propylene copolymer (R-PP).

Thus it is preferred that the first random propylene copolymer fraction (R-PP1) has a comonomer content of equal or below 8.0 mol-%, more preferably of equal or below 5.0 mol.-%, yet more preferably in the range 1.0 to 8.0 mol-%, still more preferably in the range 1.5 to 5.0 mol-%, like in the range of 2.0 to 4.5 mol-%.

Preferably the first random propylene copolymer fraction (R-PP1) preferably has a melt flow rate MFR$_2$ (230° C.) in the range of in the range of 1.5 to 8.0 g/10 min, more preferably in the range 2.0 to 6.0 g/10 min, still more preferably in the range of 2.5 to 5.0 g/10 min.

On the other hand the second random propylene copolymer fraction (R-PP2) preferably has a comonomer content in the range of more than 8.0 to 17.0 mol-%, still more preferably in the range 9.0 to 16.0 mol-%, yet more preferably in the range 10.0 to 15.5 mol-%.

Preferably the second random propylene copolymer fraction (R-PP2) preferably has a melt flow rate MFR$_2$ (230° C.) in the range of 7.0 to 28.0 g/10 min, more preferably in the range of 8.5 to 23.0 g/10 min, still more preferably in the range of 9.0 to 20.0 g/10 min.

The comonomers of the first propylene copolymer fraction (R-PP1) and random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first propylene copolymer fraction (R-PP1) and second propylene copolymer fraction (R-PP2), respectively, comprise, especially consist of, monomers copolymerizable with propylene from the group consisting of ethylene, 1-butene and 1-hexene. More specifically the first propylene copolymer fraction (R-PP1) and second propylene copolymer fraction (R-PP2), respectively, comprise—apart from propylene—units derivable from ethylene and/or 1-butene. In a preferred embodiment the first propylene copolymer fraction (R-PP1) and the second propylene copolymer fraction (R-PP2) comprise the same comonomers, i.e. ethylene only.

Preferably the weight ratio between the first propylene copolymer fraction (R-PP1) and the second propylene copolymer fraction (R-PP2) is 20/80 to 80/20, more preferably 30/70 to 70/30, like 35/65 to 65/35.

The propylene copolymer (R-PP) as defined in the instant invention may contain up to 5.0 wt.-% additives, like α-nucleating agents and antioxidants, as well as slip agents and antiblocking agents. Preferably the additive content (without α-nucleating agents) is below 3.0 wt.-%, like below 1.0 wt.-%.

Preferably the propylene copolymer (R-PP) comprises an α-nucleating agent. Even more preferred the present invention is free of β-nucleating agents. The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butyl-phenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 6th edition, 2009 of Hans Zweifel (p. 967-983).

Preferably the propylene copolymer (R-PP) contains up to 2.0 wt.-% of the α-nucleating agent. In a preferred embodiment, the propylene copolymer (R-PP) contains not more than 2000 ppm, more preferably of 1 to 2000 ppm, more preferably of 5 to 1500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

The present invention is not only directed to the instant propylene copolymer (R-PP) but also to articles made therefrom. Accordingly in a further embodiment the present invention is directed to articles, like packaging material, comprising at least 70 wt.-%, preferably comprising at least 80 wt.-%, more preferably comprising at least 90 wt.-%, still more preferably comprising at least 95 wt.-%, yet more preferably comprising at least 99 wt.-%, of the instant propylene copolymer (R-PP). Preferred articles are containers, e.g. pouches, comprising, preferably, consisting of the instant propylene copolymer (R-PP). Typically such containers are made from films, thermoformed or injection moulded components. Accordingly the present invention is also directed to films or sheets comprising, preferably consisting of, the instant propylene copolymer (R-PP). Preferably the film is made by cast film or blow film or roll-stack technology. Additionally, the present invention is directed to injection molded containers like cups or pails comprising, preferably comprising in the amounts mentioned in this paragraph, more preferably consisting of, the instant propylene copolymer (R-PP).

The present invention is also directed to the use of the propylene copolymer (R-PP) as film article, thermoformed article, or injection moulded article, like a pouch, cup or container.

The propylene copolymer (R-PP) according to this invention is preferably produced in a sequential polymerization process in the presence of a metallocene catalyst, more preferably in the presence of a catalyst (system) as defined below.

The term "sequential polymerization process" indicates that the propylene copolymer (R-PP) is produced in at least two reactors, preferably in two reactors, connected in series. Accordingly the present process comprises at least a first reactor (R1) and a second reactor (R2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) is preferably a gas phase reactor (GPR). Such gas phase reactor (GPR) can be any mechanically mixed or fluid bed reactor. For example the gas phase reactor (GPR) can be a mechanically agitated fluid bed reactor with gas velocities of at least 0.2 msec. Thus it is appreciated that the gas phase reactor is a fluidized bed type reactor, optionally with a mechanical stirrer.

Thus in a preferred embodiment the first reactor (R1) is a slurry reactor (SR), like a loop reactor (LR), whereas the second reactor (R2) is a gas phase reactor (GPR). Accordingly for the instant process two polymerization reactors, namely a slurry reactor (SR), like a loop reactor (LR), and a gas phase reactor (GPR) are connected in series. If needed prior to the slurry reactor (SR) a pre-polymerization reactor is placed.

Preferably in the first reactor (R1) the first propylene copolymer fraction (R-PP1) of the propylene copolymer is produced, whereas in the second rector (R2) the second propylene copolymer fraction (R-PP2) is produced.

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell described e.g. in FIG. 20 of the paper by Galli and Vecello, Prog. Polym. Sci. 26 (2001) 1287-1336.

Preferably, in the instant process for producing the propylene copolymer (R-PP) as defined above the conditions for the first reactor (R1), i.e. the slurry reactor (SR), like a loop reactor (LR), of step (a) may be as follows:
the temperature is within the range of 40° C. to 110° C., preferably between 60° C. and 100° C., like 68 to 95° C.,
the pressure is within the range of 20 bar to 80 bar, preferably between 40 bar to 70 bar, hydrogen can be added for controlling the molar mass in a manner known per se.

Subsequently, the reaction mixture from step (a) (containing preferably the first propylene copolymer fraction (R-PP1)) is transferred to the second reactor (R2), i.e. gas phase reactor (GPR), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The residence time can vary in the two reaction zones.

In one embodiment of the process for producing the propylene copolymer (R-PP) the residence time the first reactor (R1), i.e. the slurry reactor (SR), like a loop reactor (LR), is in the range 0.2 to 4 hours, e.g. 0.3 to 1.5 hours and the residence time in the gas phase reactor (GPR) will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactor (GPR).

The prepolymerization reaction is typically conducted at a temperature of 0 to 50° C., preferably from 10 to 45° C., and more preferably from 15 to 40° C.

The polymerization takes preferably place in the presence of a metallocene catalyst system, e.g. solid single site catalyst system, said metallocene catalyst system, e.g. said solid single site catalyst system comprises
(i) a transition metal compound of formula (I)

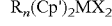

wherein
"M" is zirconium (Zr) or hafnium (Hf),
each "X" is independently a monovalent anionic 6-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2, preferably 1, and
(ii) optionally a cocatalyst (Co) comprising an element (E) of group 13 of the periodic table (IUPAC), preferably a cocatalyst (Co) comprising a compound of Al.

In one specific embodiment the solid single site catalyst system has a porosity measured according ASTM 4641 of less than 1.40 ml/g and/or a surface area measured according to ASTM D 3663 of lower than 25 m²/g. Preferably the solid catalyst system (SCS) has a surface area of lower than 15 m²/g, yet still lower than 10 m²/g and most preferred lower than 5 m²/g, which is the lowest measurement limit. The surface area according to this invention is measured according to ASTM D 3663 (N₂). Alternatively or additionally it is appreciated that the solid single site catalyst system has a porosity of less than 1.30 ml/g and more preferably less than 1.00 ml/g. The porosity has been measured according to ASTM 4641 (N₂). In another preferred embodiment the porosity is not detectable when determined with the method applied according to ASTM 4641 (N2).

Furthermore the solid single site catalyst system typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'₃, OSiR'₃, OSO₂CF₃, OCOR', SR', NR'₂ or PR'₂ group wherein R' is independently hydrogen, a linear or branched, cyclic or acyclic, C₁-C₂₀-alkyl, C₂-C₂₀-alkenyl, C₂-C₂₀-alkynyl, C₃-C₁₂-cycloalkyl, C₆-C₂₀-aryl, C₇-C₂₀-arylalkyl, C₇-C₂₀-alkylaryl, C₈-C₂₀-arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. C₁-C₂₀-alkyl, C₂-C₂₀-alkenyl, C₂-C₂₀-alkynyl, C₃-C₂₀-cycloalkyl, like C₁-C₂₀-alkyl substituted C₅-C₂₀-cycloalkyl, C₆-C₂₀-aryl, C₅-C₂₀-cycloalkyl substituted C₁-C₂₀-alkyl wherein the cycloalkyl residue is substituted by C₁-C₂₀-alkyl, C₇-C₂₀-arylalkyl, C₃-C₁₂-cycloalkyl which contains 1, 2, 3 or 4 heteroatom(s) in the ring moiety, C₆-C₂₀-heteroaryl, C₁-C₂₀-haloalkyl, —SiR"₃, —SR", —PR"₂ or —NR"₂, each R" is independently a hydrogen or hydrocarbyl (e. g. C₁-C₂₀-alkyl, C₁-C₂₀ alkenyl, C₂-C₂₀-alkynyl, C₃-C₁₂-cycloalkyl, or C₆-C₂₀-aryl) or e.g. in case of —NR"₂, the two substituents R" can form a ring, e.g. five- or six-membered ring, together with the nitrogen atom where they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as C₁-C₂₀-hydrocarbyl, tri(C₁-C₂₀-alkyl)silyl, tri(C₁-C₂₀-alkyl)siloxy and more preferably "R" is a one atom bridge like e.g. —SiR'"₂—, wherein each R'" is independently C₁-C₂₀-alkyl, C₂-C₂₀-alkenyl, C₂-C₂₀-alkynyl, C₃-C₁₂-cycloalkyl, C₆-C₂₀-aryl, alkylaryl or arylalkyl, or tri(C₁-C₂₀-alkyl)silyl-residue, such as trimethylsilyl-, or the two R'" can be part of a ring system including the Si bridging atom.

In a preferred embodiment the transition metal compound has the formula (II)

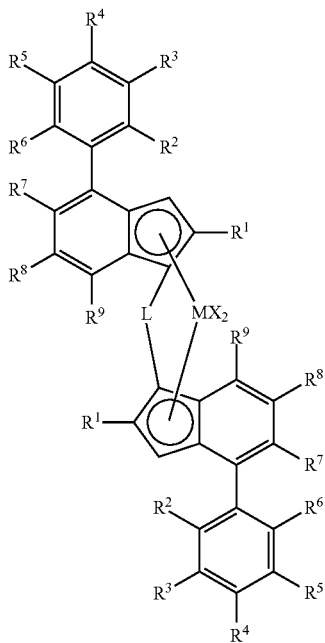

wherein

M is zirconium (Zr) or hafnium (Hf), preferably zirconium (Zr),

X are ligands with a σ-bond to the metal "M", preferably those as defined above for formula (I), preferably chlorine (Cl) or methyl ($CH_3$), the former especially preferred, $R^1$ are equal to or different from each other, and are selected from the group consisting of linear saturated $C_1$-$C_{20}$-alkyl, linear unsaturated $C_1$-$C_{20}$-alkyl, branched saturated $C_1$-$C_{20}$-alkyl, branched unsaturated $C_1$-$C_{20}$-alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably they are equal to each other, and are $C_1$-$C_{10}$ linear or branched hydrocarbyl, more preferably are equal to each other, and are $C_1$-$C_6$ linear or branched alkyl, $R^2$ to $R^6$ are equal to or different from each other and are selected from the group consisting of hydrogen, linear saturated $C_1$-$C_{20}$-alkyl, linear unsaturated $C_1$-$C_{20}$-alkyl, branched saturated $C_1$-$C_{20}$-alkyl, branched unsaturated $C_1$-$C_{20}$-alkyl, $C_3$-$C_{20}$-cycloalkyl, $C_6$-$C_{20}$-aryl, $C_7$-$C_{20}$-alkylaryl, and $C_7$-$C_{20}$-arylalkyl, optionally containing one or more heteroatoms of groups 14 to 16 of the Periodic Table (IUPAC), preferably they are equal to each other and are $C_1$-$C_{10}$ linear or branched hydrocarbyl, more preferably are $C_1$-$C_6$ linear or branched alkyl, $R^7$ and $R^8$ are equal to or different from each other and selected from the group consisting of hydrogen, linear saturated $C_1$-$C_{20}$-alkyl, linear unsaturated $C_1$-$C_{20}$-alkyl, branched saturated $C_1$-$C_{20}$-alkyl, branched unsaturated $C_1$-$C_{20}$ alkyl, $C_3$-$C_{20}$-cycloalkyl, $C_6$-$C_{20}$ aryl, $C_7$-$C_{20}$ alkylaryl, $C_7$-$C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{10}$ is selected from the group consisting of linear saturated $C_1$-$C_{20}$-alkyl, linear unsaturated $C_1$-$C_{20}$-alkyl, branched saturated $C_1$-$C_{20}$-alkyl, branched unsaturated $C_1$-$C_{20}$-alkyl, $C_3$-$C_{20}$-cycloalkyl, $C_6$-$C_{20}$-aryl, $C_7$-$C_{20}$-alkylaryl, and $C_7$-$C_{20}$-arylalkyl, optionally containing one or more heteroatoms of groups 14 to 16 of the Periodic Table (IUPAC), and/or $R^7$ and $R^8$ being optionally part of a $C_4$-$C_{20}$-carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$-$C_{20}$-alkyl, linear unsaturated $C_1$-$C_{20}$-alkyl, branched saturated $C_1$-$C_{20}$-alkyl, branched unsaturated $C_1$-$C_{20}$-alkyl, $C_3$-$C_{20}$ cycloalkyl, $C_6$-$C_{20}$-aryl, $C_7$-$C_{20}$-alkylaryl, $C_7$-$C_{20}$-arylalkyl, $OR^{10}$, and $SR^{10}$, wherein $R^{10}$ is defined as before, preferably $R^9$ are equal to or different from each other and are H or $CH_3$, most preferably $R^9$ are both H.

L is a bivalent group bridging the two indenyl ligands, preferably being a $C_2R^{11}_4$ unit or a $SiR^{11}_2$ or $GeR^{11}_2$, wherein, $R^{11}$ is selected from the group consisting of H, linear saturated $C_1$-$C_{20}$-alkyl, linear unsaturated $C_1$-$C_{20}$-alkyl, branched saturated $C_1$-$C_{20}$-alkyl, branched unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references cited therein.

Preferably the residues $R^1$ are equal to or different from each other, more preferably equal, and are selected from the group consisting of linear saturated $C_1$-$C_{10}$-alkyl, linear unsaturated $C_1$-$C_{10}$-alkyl, branched saturated $C_1$-$C_{10}$-alkyl, branched unsaturated $C_1$-$C_{10}$-alkyl and $C_7$-$C_{12}$-arylalkyl. Even more preferably the residues $R^1$ are equal to or different from each other, more preferably equal, and are selected from the group consisting of linear saturated $C_1$-$C_6$-alkyl, linear unsaturated $C_1$-$C_6$-alkyl, branched saturated $C_1$-$C_6$-alkyl, branched unsaturated $C_1$-$C_6$-alkyl and $C_7$-$C_{10}$-arylalkyl. Yet more preferably the residues $R^1$ are equal to or different from each other, more preferably equal, and are selected from the group consisting of linear or branched $C_1$-$C_4$-hydrocarbyl, such as for example methyl or ethyl.

Preferably the residues $R^2$ to $R^6$ are equal to or different from each other and linear saturated $C_1$-$C_4$-alkyl or branched saturated $C_1$-$C_4$-alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-carbon ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediylbis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

As a further requirement the solid single site catalyst system according to this invention may comprise a cocatalyst (Co) comprising an element (E) of group 13 of the periodic table (IUPAC), for instance the cocatalyst (Co) comprises a compound of Al. Examples of such cocatalyst (Co) are organo aluminium compounds, such as aluminoxane compounds.

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the $C_1$ to $C_{10}$-alkylaluminoxanes, most particularly methylaluminoxane (MAO).

Preferably, the organo-zirconium compound of formula (I) and the cocatalyst (Co) of the solid single site catalyst system represent at least 70 wt %, more preferably at least 80 wt %, even more preferably at least 90 wt %, even further preferably at least 95 wt % of the solid catalyst system.

Thus it is appreciated that the solid single site catalyst system is featured by the fact that it is self-supported, i.e. it does not comprise any catalytically inert support material, like for instance silica, alumina or $MgCl_2$, which is otherwise commonly used in heterogeneous catalyst systems, i.e. the catalyst is not supported on external support or carrier material. As a consequence of that the solid single site catalyst system is self-supported and it has a rather low surface area.

In one embodiment the solid single site catalyst system is obtained by the emulsion/solidification technology, the basic principles of which are described in WO 03/051934. This document is herewith included in its entirety by reference.

Hence the solid single site catalyst system is preferably in the form of solid catalyst particles, obtainable by a process comprising the steps of
a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components. The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$-perfluoroalkanes, -alkenes or -cycloalkanes, more preferred $C_4$-$C_{10}$-perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane) or a mixture thereof. Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$-$C_n$ (suitably $C_4$-$C_{30}$ or $C_5$-$C_{15}$) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner Reference is made to WO 2006/069733 describing principles of such a continuous or semi-continuous preparation methods of the solid catalyst types, prepared via emulsion/solidification method.

The above described catalyst components are prepared according to the methods described in WO 01/48034.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2)$$

wherein w(PP1) is the weight fraction [in wt.-%] of the first propylene copolymer fraction (R-PP1), w(PP2) is the weight fraction [in wt.-%] of second propylene copolymer fraction (R-PP2), C(PP1) is the comonomer content [in mol-%] of the first random propylene copolymer fraction (R-PP1), C(PP) is the comonomer content [in mol-%] of the random propylene copolymer (R-PP), C(PP2) is the calculated comonomer content [in mol-%] of the second random propylene copolymer fraction (R-PP2).

Calculation of melt flow rate $MFR_2$ (230° C.) of the second propylene copolymer fraction (R-PP2):

$$MFR(PP2) = 10^{\left[\frac{\log(MFR(PP))-w(PP1)\times\log(MFR(PP1))}{w(PP2)}\right]}$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate $MFR_2$ (230° C.) [in g/10 min] of the first propylene copolymer fraction (R-PP1), MFR(PP) is the melt flow rate $MFR_2$ (230° C.) [in g/10min] of the propylene copolymer (R-PP), MFR(PP2) is the calculated melt flow rate $MFR_2$ (230° C.) [in g/10 min] of the second propylene copolymer fraction (R-PP2).

$MFR_2$ (230° C.) is measured according to ISO 1133 (230° C., 2.16 kg load).

Quantification of Copolymer Microstructure by NMR Spectroscopy

Quantitative nuclear-magnetic resonance (NMR) spectroscopy was used to quantify the comonomer content of the polymers.

Quantitative $^{13}C$ {$^{1}H$} NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}C$ {$^{1}H$} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C$ {$^{1}H$} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

The Xylene Solubles (XCS, Wt.-%):

Content of xylene cold solubles (XCS) is determined at 25° C. according ISO 16152; first edition; 2005-07-01

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 20° C. The extraction was performed at a temperature of 50° C. and an extraction time of 30 min.

Number Average Molecular Weight ($M_n$), Weight Average Molecular Weight ($M_w$) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Rheology:

Dynamic rheological measurements were carried out with Rheometrics RDA-II QC on compression moulded samples under nitrogen atmosphere at 200° C. using 25 mm-diameter plate and plate geometry. The oscillatory shear experiments were done within the linear viscoelastic range of strain at frequencies from 0.01 to 500 rad/s. (ISO 6721-10) The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)\cdot\omega/[G'(\omega)^2+G''(\omega)^2]$$

$$f''(\omega)=G'(\omega)\cdot\omega/[G'(\omega)^2+G''(\omega)^2]$$

The Polydispersity Index, PI, $PI=10^5/G_c$, is calculated from the cross-over point of G'($\omega$) and G"($\omega$), for which G'($\omega_c$)=G"($\omega_c$)=$G_c$ holds.

Melting Temperature ($T_m$) and Heat of Fusion ($H_f$), Crystallization Temperature ($T_c$) and Heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

Tensile Test:

The tensile test (modulus, strength and extension at break) is measured at 23° C. according to ISO 527-1 (cross head speed 1 mm/min) using injection moulded specimens according to ISO 527-2(1B), produced according to EN ISO 1873-2 (dog 10 bone shape, 4 mm thickness).

Charpy Impact Test:

The Charpy notched impact strength (NIS) was measured according to ISO 179 1eA at +23° C. and 0° C., using injection molded bar test specimens of 80×10×4 mm³ prepared in accordance with ISO 294-1:1996

Transparency, haze and clarity were determined according to ASTM D1003-00 on 60×60×1 mm³ plaques injection molded in line with EN ISO 1873-2 using a melt temperature of 200° C.

Porosity (of the Catalyst):

BET with $N_2$ gas, ASTM 4641, apparatus Micromeritics Tristar 3000;

sample preparation: at a temperature of 50° C., 6 hours in vacuum.

Surface Area (of the Catalyst):

BET with $N_2$ gas ASTM D 3663, apparatus Micromeritics Tristar 3000: sample preparation at a temperature of 50° C., 6 hours in vacuum.

2. Examples

The catalyst used for examples IE1 to IE4 is described in example 10 of WO 2010/052263 A1. The catalyst used in the polymerization process for examples CE3 and CE4 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio for CE3 and CE4 is 10:1 (mol/mol).

TABLE 1a

Comparative Examples

| | | CE1 | CE2 | CE3 | CE4 |
|---|---|---|---|---|---|
| Loop (R-PP1) | | | | | |
| Temperature | [° C.] | | | 70 | 70 |
| $MFR_2$ | [g/10 min] | | | 3.2 | 3.2 |
| C2 content | [mol-%] | | | 0 | 0 |
| $H_2$/C3 ratio | [mol/kmol] | | | 0.9 | 0.9 |
| C2/C3 ratio | [mol/kmol] | | | 0 | 0 |
| amount | [wt.-%] | | | 80 | 45 |
| 1 GPR (R-PP2) | | | | | |
| $MFR_2$ | [g/10 min] | | | 70 | 70 |
| C2 content | [mol-%] | | | 4.1 | 4.1 |
| $H_2$/C3 ratio | [mol/kmol] | | | 3.5 | 3.5 |
| C2/C3 ratio | [mol/kmol] | | | 6.3 | 6.3 |
| amount | [wt-%] | | | 20 | 55 |
| Final | | | | | |
| $MFR_2$ | [g/10 min] | 13 | 11 | 6.8 | 12.6 |
| C2 content | [mol-%] | 3.4 | 4.2 | 0.8 | 2.3 |
| XCS | [wt.-%] | 5.8 | 9.8 | 3.0 | 3.9 |
| Tm | [° C.] | 150 | 139 | 164 | 163 |
| Mw/Mn | [—] | 5.0 | 3.4 | 4.0 | 3.6 |
| PI | [$Pa^{-1}$] | 3.2 | 2.4 | 3.1 | 3.0 |
| 2, 1 | [%] | 0.0 | 0.0 | 0.0 | 0.0 |
| Tg | [° C.] | n.d. | n.d. | n.d. | n.d. |

CE1 is the propylene copolymer "RE420MO" of Borealis AG
CE2 is the propylene copolymer "RE239CF" of Borealis AG
n.d. not determined TABLE 1b Inventive Examples

| | | IE1 | IE2 | IE3 | IE4 |
|---|---|---|---|---|---|
| Loop (R-PP1) | | | | | |
| Temperature | [° C.] | 70 | 70 | 70 | 70 |
| $MFR_2$ | [g/10 min] | 3.8 | 3.7 | 3.2 | 4.8 |
| C2 content | [mol-%] | 3.6 | 3.3 | 3.9 | 2.8 |
| $H_2$/C3 ratio | [mol/kmol] | 0.12 | 0.12 | 0.07 | 0.07 |
| C2/C3 ratio | [mol/kmol] | 14.7 | 14.7 | 14.9 | 14.5 |
| amount | [wt-%] | 59 | 60 | 47 | 49 |

TABLE 1b-continued

Inventive Examples

|  |  | IE1 | IE2 | IE3 | IE4 |
|---|---|---|---|---|---|
| 1 GPR (R-PP2) | | | | | |
| MFR$_2$ | [g/10 min] | 18.1 | 13.4 | 21.6 | 10.1 |
| C2 content | [mol-%] | 11.2 | 13.8 | 12.0 | 12.0 |
| H$_2$/C3 ratio | [mol/kmol] | 4.2 | 4.5 | 1.7 | 1.7 |
| C2/C3 ratio | [mol/kmol] | 330.4 | 374.5 | 301.5 | 300.9 |
| amount | [wt-%] | 41 | 40 | 53 | 51 |
| Final | | | | | |
| MFR$_2$ | [g/10 min] | 7.2 | 6.2 | 8.0 | 7.0 |
| C2 content | [mol-%] | 6.7 | 7.5 | 8.2 | 7.5 |
| XCS | [wt-%] | 19.2 | 26.3 | 38.6 | 31.8 |
| Tm | [° C.] | 136 | 137 | 132 | 131 |
| Mw/Mn | [—] | 3.4 | 3.5 | 3.1 | 3.1 |
| PI | [Pa$^{-1}$] | 2.9 | 2.9 | 2.6 | 2.6 |
| 2, 1 | [%] | 0.47 | 0.49 | 0.52 | 0.52 |
| Tg | [° C.] | −6 | −8 | −8 | −8 |

TABLE 2

Properties

| | C6 sol. [wt.-%] | Modulus[1] [Mpa] | Str. Y[1] [Mpa] | Ext. B[1] [%] | +23° C.[2] [kJ/m$^2$] | 0° C.[2] [kJ/m$^2$] | Transp. [%] | Haze [%] | Clarity [%] |
|---|---|---|---|---|---|---|---|---|---|
| IE1 | 3.0 | 654 | 21.9 | 493 | 8.6 | 1.9 | 92 | 37 | 92 |
| IE2 | 4.3 | 573 | 20.2 | 486 | 10.7 | 2.9 | 92 | 36 | 92 |
| IE3 | 5.2 | 525 | 19.0 | 496 | 11.1 | 2.2 | 93 | 31 | 93 |
| IE4 | 4.6 | 541 | 19.5 | 493 | 10.7 | 2.5 | 93 | 28 | 93 |
| CE1 | 5.4 | 921 | 26.0 | 372 | 5.3 | 1.0 | 84 | 23 | 84 |
| CE2 | 3.8 | 675 | 22.1 | 124 | 6.3 | 1.7 | 92 | 47 | 90 |
| CE3 | n.d. | 1803 | 38.6 | 20 | 3.2 | 1.7 | 89 | 19 | 94 |
| CE4 | n.d. | 1686 | 37.2 | 33 | 3.3 | 1.6 | 89 | 15 | 95 |

[1]Tens. test ISO527
[2]Charpy NIS ISO179

The invention claimed is:

1. Propylene copolymer (R-PP) having:
   (a) a melt flow rate MFR$_2$ (230° C.) measured according to ISO 1133 in the range of more than 2.5 to 15.0 g/10 min,
   (b) a comonomer content in the range of 2.0 to below 12.0 mol. %,
   (c) a melting temperature in the range of 125 to below 143° C.,
   (d) a xylene cold soluble fraction (XCS), determined at 25° C. according to ISO 16152, in the range of 17.0 to 45.0 wt. %,
   (e) a molecular weight distribution (Mw/Mn) of at least 2.7; and/or a polydispersity index (PI) of at least 2.3, and
   (f) 2,1 regio-defects of at least 0.2% determined by $^{13}$C-NMR spectroscopy.

2. Propylene copolymer (R-PP) according to claim 1, wherein said propylene copolymer (R-PP) has:
   (a) a glass transition temperature in the range of −12 to +2° C.; and/or
   (b) no glass transition temperature below −20° C.

3. Propylene copolymer (R-PP) according to claim 1, wherein said propylene copolymer (R-PP) is monophasic.

4. Propylene copolymer (R-PP) according to claim 1, wherein the comonomer is selected from ethylene, $C_4$ to $C_{12}$ α-olefin, and mixtures thereof.

5. Propylene copolymer (R-PP) according to claim 1, wherein said propylene copolymer (R-PP) comprises two fractions, a first propylene copolymer fraction (R-PP1) and a second propylene copolymer fraction (R-PP2), said first propylene copolymer fraction (R-PP1) differs from said second propylene copolymer fraction (R-PP2) in the melt flow rate MFR$_2$ (230° C.) and/or in the comonomer content.

6. Propylene copolymer (R-PP) according to claim 5, wherein:
   (a) the weight ratio between the first propylene copolymer fraction (R-PP1) and the second propylene copolymer fraction (R-PP2) [(R-PP1):(R-PP2)] is 70:30 to 30:70; and/or
   (b) the comonomers for the first propylene copolymer fraction (R-PP1) and the second propylene copolymer fraction (R-PP2) are selected from ethylene, $C_4$ to $C_{12}$ α-olefin, and mixtures thereof.

7. Propylene copolymer (R-PP) according to claim 5, wherein:
   (a) the first propylene copolymer fraction (R-PP1) is the comonomer lean fraction and the second propylene copolymer fraction (R-PP2) is the comonomer rich fraction; and/or,
   (b) the first propylene copolymer fraction (R-PP1) has a lower melt flow rate MFR$_2$ (230° C.) than the second propylene copolymer fraction (R-PP2).

8. Propylene copolymer (R-PP) according to claim 5, wherein:
   (a) the first propylene copolymer fraction (R-PP1) has a lower comonomer content than the propylene copolymer (R-PP); and/or
   (b) the first propylene copolymer fraction (R-PP1) has a lower melt flow rate MFR$_2$ (230° C.) than the propylene copolymer (R-PP).

9. Propylene copolymer (R-PP) according to claim 5, wherein:
   (a) the first propylene copolymer fraction (R-PP1) has a comonomer content in the range of 1.0 to 8.0 mol % based on the first propylene copolymer fraction (R-PP1); and/or
   (b) the second propylene copolymer fraction (R-PP2) has a comonomer content in the range of more than 8.0 to 17.0 mol % based on the second propylene copolymer fraction (R-PP2).

10. Propylene copolymer (R-PP) according to claim 5, wherein:
   (a) the first propylene copolymer fraction (R-PP1) has a melt flow rate MFR$_2$ (230° C.) in the range of 1.5 to 8.0 g/10 min; and/or
   (b) the second propylene copolymer fraction (R-PP2) has a melt flow rate MFR$_2$ (230° C.) in the range of more than 7.0 to 28.0 g/10 min.

11. Propylene copolymer (R-PP) according to claim 5, wherein:
(a) the first random propylene copolymer fraction (R-PP1) and the second random propylene copolymer fraction (R-PP2) fulfill together the inequation (IV):

$$\frac{MFR(R-PP2)}{MFR(R-PP1)} \geq 1.1 \qquad (IV)$$

wherein, MFR (R-PP1) is the melt flow rate $MFR_2$ (230° C.) [g/10 min] of the first propylene copolymer fraction (R-PP1),
MFR (R-PP2) is the melt flow rate $MFR_2$ (230° C.) [g/10 min] of the second propylene copolymer fraction (R-PP2); and/or,
(b) the first random propylene copolymer fraction (R-PP1) and the random propylene copolymer fraction (R-PP) fulfill together the inequation (VI):

$$\frac{MFR(R-PP)}{MFR(R-PP1)} \geq 1.1 \qquad (VI)$$

wherein, MFR (R-PP1) is the melt flow rate $MFR_2$ (230° C.) [g/10 min] of of the first propylene copolymer fraction (R-PP1), and/or
MFR (R-PP) is the melt flow rate $MFR_2$ (230° C.) [g/10 min] of the propylene copolymer fraction (R-PP).

12. Propylene copolymer (R-PP) according to claim 5, wherein:
(a) the first random propylene copolymer fraction (R-PP1) and the second random propylene copolymer fraction (R-PP2) fulfill together the inequation (III):

$$\frac{Co(R-PP2)}{Co(R-PP1)} \geq 2.0; \qquad (III)$$

wherein, Co (R-PP1) is the comonomer content [mol. %] of the first propylene copolymer fraction (R-PP1),
Co (R-PP2) is the comonomer content [mol. %] of the second propylene copolymer fraction (R-PP2), and/or,
(b) the first random propylene copolymer fraction (R-PP1) and the random propylene copolymer fraction (R-PP) fulfill together the inequation (V):

$$\frac{Co(R-PP)}{Co(R-PP1)} \geq 0.5 \qquad (V)$$

wherein, Co (R-PP1) is the comonomer content [mol. %] of the first propylene copolymer fraction (R-PP1), and/or
Co (R-PP) is the comonomer content [mol. %] of the propylene copolymer fraction (R-PP).

13. Process for producing the propylene copolymer (R-PP) claim 1, producing the propylene copolymer (R-PP) in the presence of a metallocene catalyst of formula (I):

$$R_n(Cp')_2MX_2 \qquad (I)$$

wherein, "M" is zirconium (Zr) or hafnium (Hf),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'), and
"n" is 1 or 2.

14. Process according to claim 13, wherein the propylene copolymer (R-PP) is produced in a sequential polymerization process comprising at least two reactors (R1) and (R2), in the first reactor (R1) the first propylene copolymer fraction (R-PP1) is produced and subsequently transferred into the second reactor (R2), in the second reactor (R2) the second propylene copolymer fraction (R-PP2) is produced in the presence of the first propylene copolymer fraction (R-PP1).

15. Article comprising the propylene copolymer (R-PP) according to claim 1, wherein the article is a packaging material, or a container.

16. Article according to claim 15, wherein the article:
(a) comprises a film, said film comprising the propylene copolymer (R-PP), or
(b) is an injection molded article; or
(c) is a thermoformed article.

* * * * *